(No Model.)

O. C. WHITE.
SUPPORT FOR ELECTRIC LAMPS.

No. 596,729. Patented Jan. 4, 1898.

Witnesses.
W. J. Baldwin
E. M. Healy

Inventor.
O. C. White.
By
Southgate & Southgate
Attorneys.

UNITED STATES PATENT OFFICE.

OTIS C. WHITE, OF WORCESTER, MASSACHUSETTS.

SUPPORT FOR ELECTRIC LAMPS.

SPECIFICATION forming part of Letters Patent No. 596,729, dated January 4, 1898.

Application filed February 16, 1897. Serial No. 623,712. (No model.)

*To all whom it may concern:*

Be it known that I, OTIS C. WHITE, a citizen of the United States, residing at Worcester, in the county of Worcester and State of Massachusetts, have invented a new and useful Improvement in Supports for Electric Lamps, of which the following is a specification.

The object of my invention is to provide a simple and efficient support for electric lamps or other fixtures in which the electric wires will be housed, so that they will not become kinked or abraded.

To these ends my invention consists of the parts and combinations of parts, as hereinafter described, and more particularly pointed out in the claims at the end of this specification.

Figure 1:
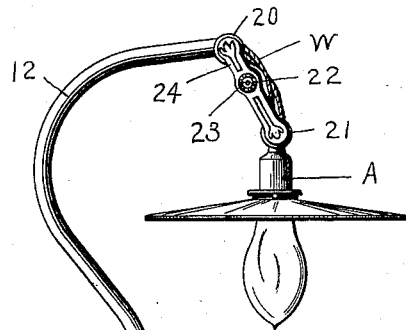
Figure 3:
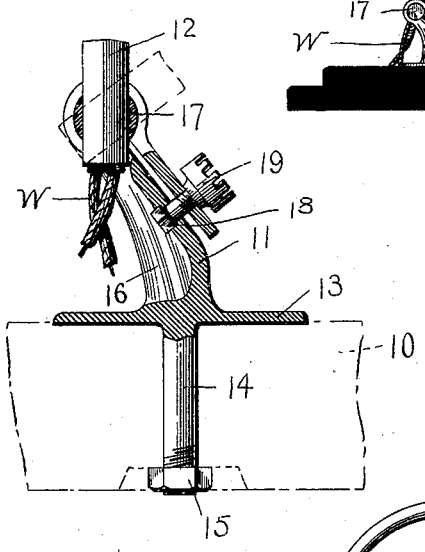
Figure 2:
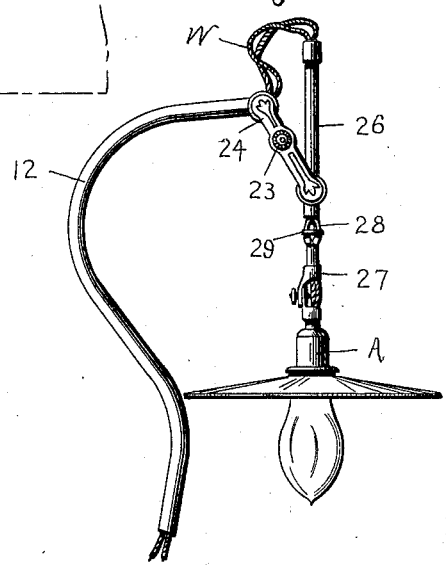
Figure 4:
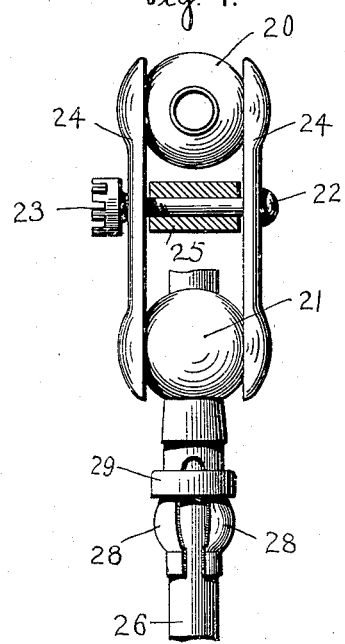

In the accompanying drawings, Figure 1 is a side view of an electric-lamp support constructed according to my invention. Fig. 2 is a partial side view illustrating a slightly-modified form of construction. Fig. 3 is a sectional view of the base bracket or support, and Fig. 4 is a detail view to be hereinafter referred to.

An electric-lamp support constructed according to my invention comprises a base piece or bracket, a pipe pivotally mounted therein, and two ball-and-socket joints for connecting the end of the pipe with an electric-lamp socket or other fixture. The electric wires for the lamp may be led up inside of the pipe, and the ball-and-socket joints are so located with respect to each other that the wires will not become twisted or abraded, no matter how frequently the lamp-socket is turned or adjusted.

Referring to the drawings and in detail, 10 designates a base-plate or pedestal, secured in which is a support or bracket 11 for pivotally supporting the pipe 12. The support 11, as most clearly illustrated in Fig. 3, is provided with a flange 13 and an integral downwardly-extending stud 14 for receiving a securing-nut 15. A cylindrical piece 17 is secured on the pipe 12, and the support or bracket 11 is made in the form of a split yoke for receiving said cylindrical piece 17. The support 11 is provided with a cut-away portion or recess 16 for receiving the electric wires W, which extend up through the pipe 12. A bolt 18, provided with a square head engaging a corresponding socket, has a clamping-nut 19 threaded thereon for adjusting the friction to be exerted upon the cylindrical piece 17. The support 11 is preferably cut away near its center, so as to allow the pipe 12 to turn freely through a considerable arc and to form stops for limiting the motion of the pipe 12.

The ball-and-socket joints for connecting the electric-lamp socket or other fixture A with the pipe 12 comprises a ball 20, secured upon the upper end of the pipe 12, and a second ball 21. The balls 20 and 21 are connected by means of two yoke-pieces 24. A clamping-screw 22, secured in one of the yoke-pieces 24, extends loosely through the other yoke-piece and is provided with a clamping-nut 23 for adjustably clamping the yoke-pieces into engagement with the balls 20 and 21.

As shown most clearly in Fig. 4, the clamping-screw 22 is located somewhat nearer to the ball 20 than to the ball 21, and I have found this to be an important point in practice, as by means of this adjustment the clamping-nut 23, when tightened, will exert a greater pressure upon the ball 20 than upon the ball 21. Thus by means of this construction the ball-and-socket joint formed by the yoke-pieces 24 and the ball 20 will be stiffer or capable of more resistance than the ball-and-socket joint formed by the yoke-pieces 24 and the second ball 21. This relative stiffness of the joints is desirable, as the first ball-and-socket joint has to sustain a somewhat greater weight than the second ball-and-socket joint.

In order to prevent all possibility of abrading the insulating-coverings of the wires W, I may journal a rubber bushing 25 upon the screw 21, and the openings to the pipes and balls may be provided with suitable rubber bushings, as indicated in Figs. 3 and 4.

In some cases, instead of having the second ball 21 directly connected to the electric-lamp socket, I may provide an additional slide or pipe, and I have illustrated such a construction in Figs. 2 and 4. As illustrated in these figures, a sliding pipe 26 extends through the ball 21 and is connected with the electric-light socket A by means of a knuckle-joint 27. Extending down from and connected to the ball 21 I provide a plurality of metallic spring-fingers 28. A clamping-ring 29 is mounted on the spring-fingers 28 in position to be forced down thereon to clamp the same into frictional engagement with the sliding pipe 26. By means of this construction the electric lamp may be given a somewhat wider range of adjustment than in the construction previously described.

I am aware that changes may be made in the construction of electric-light supports by those who are skilled in the art without departing from the scope of my invention as expressed in the claims. I do not wish, therefore, to be limited to the form which I have shown and described; but What I do claim, and desire to secure by Letters Patent of the United States, is—

1. The combination of a support, a pipe pivotally connected thereto, a ball secured to the end of said pipe, an electric-lamp fixture, a ball connected thereto, yoke-pieces, and a single clamping device for adjustably clamping said pieces into engagement with the balls, substantially as described.

2. The combination of a support, a pipe pivotally connected thereto, a ball secured on the end of said pipe, an electric-lamp fixture, a ball connected to said fixture, two yoke-pieces, and a clamping-screw for adjustably clamping the yoke-pieces into engagement with the balls, said clamping-screw being located a shorter distance from the ball carried by the pipe than from the ball connected to the lamp-fixture so as to exert greater pressure upon the first-named than upon the second-named ball, substantially as described.

3. In a support for electric lamps, the combination of a pedestal or base-plate 10, a support 11, a pipe pivotally mounted therein and adapted to receive electric-light wires, two ball-and-socket joints for connecting the pipe with an electric-lamp fixture, one ball-and-socket joint being formed by the yoke-pieces 24 and a ball 21 carried by the pipe 12, the second joint being formed by the yoke-pieces 24 and a ball 21 connected to a lamp-fixture, a clamping-screw 23, the clamping-nut 24, and rubber bushings for preventing the electric wires from becoming abraded, substantially as described.

4. The combination of a pipe 12, a cylindrical piece 17 secured thereon, and a support 11 comprising a disk or plate 13, an integral securing-stud 14 having a recess 16 in its rear face, a screw 18 secured in said support, and a clamping-screw 19 for adjustably clamping the support into engagement with the cylindrical piece 17, substantially as described.

5. The combination of a support, a ball-and-socket joint, a rod or pipe section extending through the ball of said joint, a friction device carried by said ball, and means for adjustably clamping the friction device into engagement with the rod or pipe section, substantially as described.

6. The combination of a ball, a rod or pipe section extending through said ball, spring-arms carried by the ball, and means for adjustably clamping said spring-arms into engagement with the rod or pipe section, substantially as described.

7. The combination of a ball, a rod or pipe section extending through said ball, spring-arms carried by the ball, and a movable ring for adjustably clamping said spring-arms into engagement with the rod or pipe section, substantially as described.

8. The combination of a base-plate or pedestal 10, a support or bracket 11 secured therein, a pipe 12 pivotally mounted in said support, a ball secured on the end of said pipe, a ball 21, yoke-pieces 24 for adjustably connecting said balls, a pipe-section 26 extending through the ball 21, spring-arms 28 carried by the ball, and a ring 29 for adjustably clamping said spring-arms into engagement with the pipe-section, substantially as described.

In testimony whereof I have hereunto set my hand in the presence of two subscribing witnesses.

OTIS C. WHITE.

Witnesses:
PHILIP W. SOUTHGATE,
LOUIS W. SOUTHGATE.